3,071,566
PURIFICATION OF ETHYLENE-PROPYLENE COPOLYMERS
Richard D. Cassar, West Chester, Pa., and John D. Tice, Wilmington, Del., assignors to Sun Oil Company, Philadelphia, Pa., a corporation of New Jersey
No Drawing. Filed Apr. 18, 1961, Ser. No. 103,710
5 Claims. (Cl. 260—88.2)

This invention relates to a process for purifying hydrocarbon-soluble olefin polymers and copolymers and more particularly to a method for removing catalyst residues and hydrocarbon insoluble polymers from solutions of the olefin polymers and copolymers.

The copolymerization of ethylene and propylene in the presence of a coordination complex catalyst such as the reaction product of vanadium oxytrichloride and aluminum triisobutyl in a liquid hydrocarbon reaction medium to yield a product resembling unvulcanized rubber is known to the art, and is described in Belgian Patent 553,655. In such a process, after completion of the reaction, the reaction product is treated with methanol to destroy the activity of the catalyst and to convert the catalyst residues to water-soluble compounds. The solution of copolymer in the reaction product is then washed with water and steam-stripped to remove the liquid hydrocarbon and to recover the copolymer in crumb form.

While the major part of the ethylene and propylene is converted to a non-crystalline random copolymer which is soluble in the reaction medium, a small part of the ethylene or propylene is converted either to a homopolymer of one of the monomers or to a copolymer in which the molecule contains long blocks of ethylene or propylene homopolymer which appear to be crystalline by X-ray analysis. This type of polymer is insoluble in the reaction medium and appears therein as a gel swollen with the liquid reaction medium. It is extremely difficult to separate the gel from the solution by filtration due to its gelatinous nature, and if the gel is not separated from the soluble copolymer, the physical properties of vulcanized copolymer are adversely affected. The gel has a specific gravity greater than the solution, so that it will settle out on prolonged standing, but this is an unsatisfactory method of separation in commercial operation, due to the excessive storage facilities required.

It has been found that conventional methods for removing catalyst residues from the polymer solution, such as by treatment with water followed by decantation, do not completely remove catalyst residues, since a good part of the residues are occluded by the gel, and cannot be removed therefrom by conventional means. If the gel is not separated from the solution, the occluded catalyst residues will impart an undesirable green color to the raw copolymer upon evaporation of the solvent. Furthermore, the catalyst residues will catalyze oxidation of the copolymer after it has been fabricated into articles of commerce.

The same problem is encountered in working up solutions of other olefin polymers containing gel-like materials which adversely affect the properties of the polymer. For example, solutions of atactic polypropylene, produced as a by-product in the manufacture of high molecular weight crystalline isotactic polypropylene, frequently are contaminated with lower molecular weight crystalline material which passes through the filters or centrifuges in which isotactic polymer is separated from the reaction medium. Atactic polypropylene is useful as an adhesive and as a tackifier for copolymer rubber, but the presence of any substantial amount of low molecular weight isotactic copolymer considerably weakens the adhesive bond.

It is an object of this invention to provide an improved method for removing insoluble polymer from solutions of hydrocarbon-soluble olefin polymers or copolymers.

It is a further object of this invention to provide a method for obtaining ethylene-propylene copolymers having a very low content of catalyst residues, and which is without objectionable color. We have now discovered that the foregoing objects may be attained by adding to the solution, as it recovered from the reactor, a surfactant, a chelating agent, and water, and then subjecting the mixture to agitation in order to emulsify the solution and the water. The amount of water used should be sufficient to cause the emulsion to have a specific gravity in excess of that of the gel, which will generally range from 0.70 to 0.75. Agitation should be carried out at a temperature below about 150° F. Ambient temperature is conveniently used. In treating solutions of polymer which do not contain appreciable amounts of catalyst residues, the chelating agent can be omitted. For example, in working up polypropylene reaction mixtures, the slurry as received from the reactor is usually treated with methanol to convert the catalyst to water-soluble compounds, and the methanol and catalyst residues are washed out of the slurry with water. The isotactic polymer is then separated from the liquid by filtration, and the atactic polymer is recovered as a hydrocarbon solution essentially free of catalyst residues.

Once the emulsion has been formed, the gel will rise to the surface in a form resembling oatmeal, and may be readily removed by skimming or centrifuging. After removal of the gel, the emulsion is broken by heating to a temperature in excess of 150° F., preferably about 190° F., and the aqueous phase, containing dissolved catalyst residues, is separated from the hydrocarbon phase. The copolymer is then separated from the liquid hydrocarbon by any convenient means, such as steam stripping, and is recovered as a white crumb containing only very small quantities of catalyst residues.

In order that those skilled in the art may more fully understand the nature of our invention and the method of carrying it out, the following examples are given.

EXAMPLE I

Ethylene and propylene were copolymerized in solution in hexane in the presence of a vanadium oxytrichloride-aluminum triisobutyl complex catalyst, the proportion of ethylene and propylene added to the reactor during the run being such as to yield a molar proportion of ethylene to propylene in the copolymer of 68:32. After 1.5 hours the reaction was stopped by the addition of a small quantity of methanol in order to destroy the activity of the catalyst and to convert the components of the catalyst into water-soluble compounds. At this point the reactor contained 375 gallons of a solution of 80 pounds of copolymer in hexane, together with 5% by weight of gel, based on copolymer. 150 gallons of water were then added together with 2 pounds of an alkyl phenol-ethylene oxide condensation product surface active agent, 1560 grams of citric acid, and 10 grams of an antioxidant. The mixture was then subjected to agitation until a hexane-water emulsion was formed, after which the emulsion was held in a quiescent state until the gel floated to the surface.

The gel was skimmed off the surface of the emulsion, and the emulsion was then heated to 190° F., with stirring, until the emulsion had broken. The aqueous layer was then drawn off and the solution of copolymer in hexane was transferred to a vessel in which it was steam stripped to drive overhead the hexane. Water-wet crumbs of copolymer were then recovered, and the adherent water was driven off in a dryer. The product was a white crumb of good appearance.

EXAMPLE II

The polymerization was carried out under the same conditions as in Example I, except that the ratio of ethylene to propylene in the feed was adjusted to yield an ethylene-propylene mol ratio in the copolymer of 63:37. The product was then worked up in the manner described in Example I, and a white crumb product was recovered.

EXAMPLE III

The polymerization was conducted as in Example I except that the ethylene-propylene ratio in the feed was adjusted to yield a copolymer having an ethylene-propylene mol ratio of 59:41. The product was worked up in the procedure used in Example I, and a white crumb product resulted.

Additional polymerization runs were made under the same conditions as in Examples I, II and III. The resultant reaction products were worked up by killing the catalyst with 100 gallons of a 0.4% aqueous solution of citric acid, and steam stripping in the presence of a small quantity of a surfactant. The resultant crumb, after drying, was green in color and contained the gel formed in the reaction. These runs were designated Controls I, II and III.

The products resulting from each of the foregoing examples and controls were compounded in the following proportions on a Banbury mixer: 100 parts by weight of copolymer, 4 parts of dicumyl peroxide, one part of sulfur, one part of zinc oxide, and 50 parts by weight of carbon black (Philblack 0). The compounds were then vulcanized at 300° F. for 60 minutes. Physical properties of the raw copolymer, the compounded copolymer, and the vulcanizate are listed in the following table.

Table 1

| Example or Control | Ex. I | Cont. I | Ex. II | Cont. II | Ex. III | Cont. III |
|---|---|---|---|---|---|---|
| Percent $C_2$= in copolymer | 68 | 67 | 63 | 62 | 59 | 59 |
| Metals content, p.p.m.: | | | | | | |
|   Vanadium | 8 | 97 | nil | 97 | 28 | 85 |
|   Aluminum | 15 | 343 | 75 | 204 | 96 | 165 |
|   Iron | 6 | 3 | 13 | 14 | 5 | 3 |
| Mooney Viscosity: | | | | | | |
|   Raw | 37 | 42 | 39.5 | 65 | 42.5 | 48 |
|   Compounded | 69 | 111 | 80 | 200 | 100 | 150 |
| Stiffening Factor [1] | 187 | 265 | 202 | 325 | 235 | 320 |
| Vulcanizate: | | | | | | |
|   Tensile Strength | 3,250 | 2,725 | 2,700 | 2,200 | 2,900 | 2,525 |
|   300% Modulus | 1,225 | 1,225 | 1,200 | 1,450 | 1,300 | 1,175 |
|   Percent Elongation | 555 | 530 | 540 | 405 | 520 | 520 |
|   Hardness | 54 | 57 | 56 | 60 | 58 | 56 |
|   Percent Set | 13 | 44 | 19 | 25 | 19 | 25 |

[1] Stiffening Factor = $\frac{\text{Mooney raw}}{\text{Mooney compounded}} \times 100$.

As may be seen in the foregoing removal of gel in accordance with the present invention results in far lower metal contents in the raw copolymer and the vulcanizate has superior tensile strength, elongation, and permanent set over vulcanizates made from copolymer of similar ethylene content from which the gel had not been removed. More importantly, the compounded Mooney viscosity of copolymers worked up in accordance with the present invention is sufficiently low to permit ready extrusion, whereas if the gel is allowed to remain in the copolymer the compounded Mooney viscosity is so high that the compounded copolymer can be extruded only with the greatest difficulty.

While in the foregoing examples citric acid was used as the chelating agent, other chelating agents such as oxalic acid or ethylene diamine tetraacetic acid may also be used. The use of a chelating agent is not, however, an essential part of our invention, which is directed mainly to the removal of undesired gels from polymer solutions, but it is preferred since somewhat lower metal contamination is obtained by the use of chelating agents. However, since the bulk of the metallic contaminants are occluded by the gel, reduced metallic contamination may be obtained in the absence of chelating agents when the gel is removed in accordance with the present invention. When used, the chelating agent is employed in the range of 0.01 to 1.0% by weight, based on the weight of the water employed.

While the surfactant used in the examples was an alkyl phenol-ethylene oxide condensation product, other non-ionic surfactants such as the products of condensation of ethylene oxide with fatty alcohols, fatty acids, resin acids, and tall oil may be used. Generally the surfactant should be in the amount of from 0.01 to 0.5% by weight, based on the weight of the water. Of these surfactants, we prefer to use the type most soluble in water, as less contamination of the polymer by surfactant results.

As to the amount of water to be used, at least 20% by volume of the emulsion should be water, but preferably from about 30% to about 50% is used, since at the higher water concentration, with consequently increased specific gravity of the emulsion, the gel will rise to the surface more rapidly than at lower water concentration.

While certain advantages of the invention have already been pointed out, other important advantages result from the practice of the invention. For example, the emulsion formed in the reactor is much more fluid than the solution of the polymer, so that the reaction product is more easily removed from the reactor.

The invention claimed is:

1. A process for working up solutions of ethylene-propylene copolymers which comprises mixing a solution of ethylene-propylene copolymer in a hydrocarbon solvent, which solution is contaminated by a gel formed as a byproduct in the copolymerization of ethylene and propylene in the presence of a catalyst prepared by contacting a metallic halide selected from the group consisting of halides of a metal of Groups IVB, VB and VIB of the periodic system with an organo-aluminum compound, with water containing a surfactant, agitating the mixture for a period of time to cause emulsification of the solution with the water, the water being present in an amount sufficient to cause the specific gravity of the emulsion to exceed that of the gel, separating the gel from the emulsion, breaking the emulsion into an aqueous phase and a hydrocarbon phase, and recovering ethylene-propylene copolymer from the hydrocarbon phase.

2. The process according to claim 1 in which the water also contains a chelating agent.

3. The process according to claim 2 in which the chelating agent is citric acid.

4. The process according to claim 2 in which the chelating agent is oxalic acid.

5. The process according to claim 2 in which the chelating agent is ethylene diamine tetraacetic acid.

References Cited in the file of this patent

UNITED STATES PATENTS 3,009,891    Cooper _____ Nov. 21, 1961